United States Patent [19]
Ramsey et al.

[11] Patent Number: 5,171,584
[45] Date of Patent: Dec. 15, 1992

[54] SYSTEM FOR DETERMINING THE DISTANCE BETWEEN TWO SOLID BODIES

[75] Inventors: Charles R. Ramsey, Dunkirk; Russell E. Holcomb; Brian L. Backus, both of Muncie, all of Ind.

[73] Assignee: Matrix Technologies, Inc., Muncie, Ind.

[21] Appl. No.: 696,712

[22] Filed: May 7, 1991

[51] Int. Cl.[5] .............................. B29C 39/44
[52] U.S. Cl. ..................... 425/135; 33/710; 164/150; 425/171; 425/172
[58] Field of Search ......... 425/135, 171, 172; 33/710; 264/40.1, 40.5; 164/150

[56] References Cited

U.S. PATENT DOCUMENTS

| | | | |
|---|---|---|---|
| 3,677,680 | 7/1972 | Etherington | 264/40.5 X |
| 4,473,345 | 9/1984 | McDowall | 264/40.5 X |
| 4,580,965 | 4/1986 | Wernecke | 425/171 X |
| 4,675,141 | 6/1987 | Kumazaki | 264/40.5 X |
| 4,699,580 | 10/1987 | Co | 264/40.1 X |
| 4,824,351 | 4/1989 | Ramsey | 425/135 |

Primary Examiner—Richard L. Chiesa
Attorney, Agent, or Firm—Willian Brinks Olds Hofer Gilson & Lione

[57] ABSTRACT

A nozzle for a gap measuring system includes a short outlet passageway defined by a smooth, cylindrical wall terminating in an outlet orifice and having an entrance orifice surrounded by a wall portion that is substantially perpendicular to the outlet passageway. As fluid flows through the nozzle, it encounters the surrounding wall portion at the entrance of the short outlet passageway of the nozzle which constricts the fluid flow upon entry into the short outlet passageway of the nozzle. As a result of the nozzle geometry, the fluid exits the nozzle outlet with a higher velocity, lower pressure and decreased turbulence. The incorporation of such a nozzle into a gap measuring system can produce an increase in the reliability and accuracy of distance determinations nearly ten times that which was previously attainable with prior nozzle inserts.

17 Claims, 4 Drawing Sheets

5,171,584

SYSTEM FOR DETERMINING THE DISTANCE BETWEEN TWO SOLID BODIES

FIELD OF THE INVENTION

This invention relates to a gap measuring system which is adapted to determine the distance between two surfaces with a high degree of accuracy, and more particularly, to a gap measuring system capable of use with apparatus, such as molding and gauging systems to determine the distances between adjacent elements at variable close locations with a high degree of accuracy.

BACKGROUND OF INVENTION

In many operational and manufacturing apparatus and processes it is advantageous that the distance between two solid bodies be determined with great accuracy. However, in many instances it is difficult, and sometimes impossible, to manually determine the distance between two bodies because of harsh environmental effects, e.g., temperature, distortion of inner surfaces caused by high temperatures, dangerous forces and pressures, size of the respective bodies and other such prohibiting factors. For example, as set forth in assignee's prior U.S. Pat. No. 4,824,351 entitled MOLDING AND GAUGING SYSTEM (hereinafter "Assignee's Patent"), the disclosure of which is incorporated herein by reference, a gap measuring system can be used in a die casting or plastic molding system to determine the distances between molding element surfaces. In such molding systems, the molding elements may not entirely close upon each other because of faulty manufacturing, misalignment or warping of the molding elements and other causes. Consequently, during the casting process the parts may not be formed to specification, molten metal or plastic may be wastefully expelled between the molding elements, and the resulting cast parts may be rejected or require extensive machining with great cost. The use of the gap measuring system of Assignee's Patent, with the molding systems as described therein, permits molding systems to be operated with increased accuracy and reliability and substantial decreases in costs of operation, reject parts and machining processes.

In the system of Assignee's Patent, the nozzle insert incorporated into the system was a separate, hard, mold insert with a diameter of about 0.5 inch forming a circular orifice with diameter of 0.147 inch by a frustoconical inner wall with an included angle of about 90° at the end of a long, circular passageway having an inner diameter of 0.375 inch. The circular orifice was located at a selected surface of a mold element.

SUMMARY OF THE INVENTION

It has been discovered that the incorporation of a nozzle of this invention into a gap measuring system can produce an increase in the reliability and accuracy of distance determinations nearly ten times that which was previously attainable with prior nozzle inserts described in Assignee's Patent. Consequently, this invention provides a system for measuring the distance between two solid surfaces with greater reliability and accuracy than was previously attainable, and the use of this invention permits a more accurate and reliable measurement and monitoring of industrial apparatus and processes.

In broadest terms, this invention includes a system for measuring the distance between a first surface and second surface which are in relatively close proximity to each other. At the upstream end of the system is a pressure source for providing fluid to the system at known pressures. At the downstream end of the fluid flow path is a nozzle forming means of this invention providing a defined nozzle passageway and orifice for directing a flow of fluid from one of the surfaces into the gap between the surfaces. Located between the pressure source and the nozzle forming means is an upstream orifice of a known diameter. Between the upstream orifice and the nozzle forming means is a monitoring device for determining the pressure in the fluid line between the upstream orifice and the nozzle forming means and a correlating means for correlating the fluid pressure determined by the monitoring means to the spacing between the first and second surfaces.

The nozzle forming means of this invention comprises a short outlet passageway defined by a smooth, cylindrical wall terminating in an outlet orifice and having an entrance orifice surrounded by a wall portion that is substantially perpendicular to the outlet passageway. As fluid flows through the fluid line and enters the nozzle forming means, it encounters the surrounding wall portion at the entrance of the short outlet passageway which constricts the fluid flow upon entry into the short outlet passageway of the nozzle. As a result of the nozzle geometry of the nozzle forming means of this invention, the fluid exits the nozzle outlet with a higher velocity, lower pressure and decreased turbulence thereby resulting in an improved reliability and accuracy of the system measurements. In more complex embodiments of the invention, the correlating means is capable of converting the pressure measurement sensed by the monitoring means to a digital signal which can then be analyzed and/or stored by digital data processing apparatus such as microprocessors.

These and other features of this invention are shown and more particularly described in the following drawings and description.

BEST MODE FOR CARRYING OUT THE INVENTION

Figure 1:
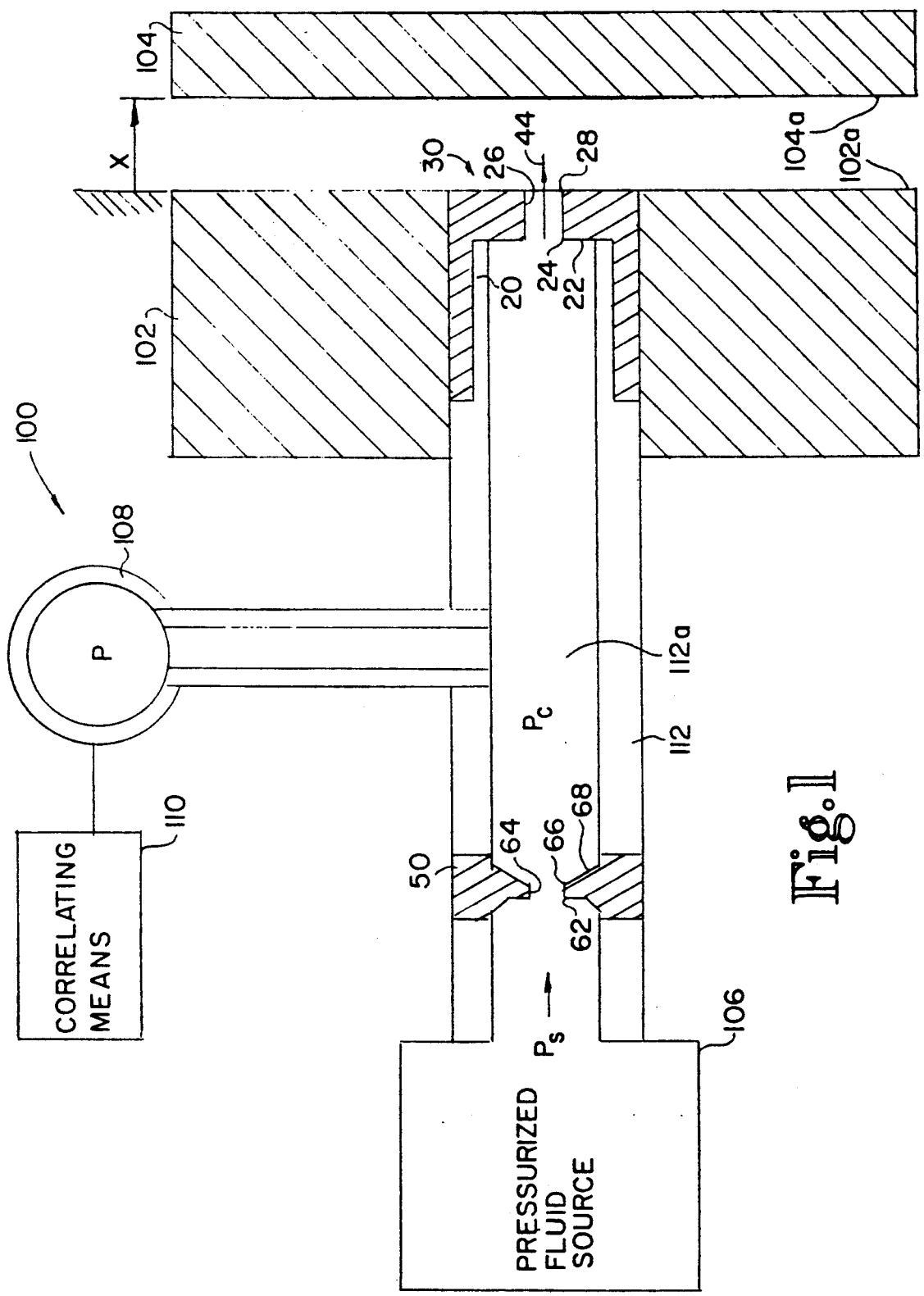
FIG. 1 is a diagrammatic illustration of an air gap measuring system incorporating this invention.

FIG. 1 shows a gap measuring system 100 and the general fluid flow and pressures used to establish the spacing x between the first surface 102a of a first body 102 and the second surface 104a of a second body 104. An explanation of the underlying theory of a gap measuring system, such as that shown in FIG. 1, in which the current invention is incorporated can be found in Assignee's Patent.

In general, the gap measuring system 100 includes a pressurized fluid source 106, an orifice means 50, a fluid line 112 forming a passageway 112a, a monitoring means 108, a correlating means 110 and a nozzle forming means 30. The pressurized fluid source 106 provides fluid at a known pressure Ps to the fluid line 112. Orifice means 50 includes an orifice passageway 64 with a known area which provides an upstream restriction for the fluid flow from the pressurized fluid source 106 and produces flow conditions with pressure Pc between the orifice means 50 and the nozzle forming means 30 which vary with the spacing of the surfaces 102a and 104a. Monitoring means 108 senses the pressures Pc in the fluid line 112a. Correlating means 110 converts the pressure measurement sensed by the monitoring means 108 into an analog and digital indication of the distance between surfaces 102a and 104a.

As shown in FIG. 1, the system of this invention includes a nozzle forming means 30 including internal surfaces which direct the flowing fluid, indicated by arrow 44 into the space or gap between surfaces 102a and 104a in a manner providing greatly increased accuracy and reliability in the measurements of the system. The nozzle forming means 30 includes a short outlet passageway 26 defined by smooth, cylindrical walls about a central axis. The short outlet passageway 26 terminates in an outlet orifice 28 which is generally coplanar with the first surface 102a. The entrance orifice 24 of the outlet passageway 26 is surrounded by a wall portion 22 that is substantially perpendicular to the central axis of the outlet passageway 26. In one nozzle forming means 30 of this invention, the outlet passageway 26 is formed by reaming the passageway to provide a "0" taper. The diameter of outlet passageway 26 and orifice 28 is 0.147 inches and the length of the short outlet passageway 26 is 0.281 inches. Fluid flowing through the nozzle forming means 30 encounters the wall portion or shoulder 22 extending in a direction perpendicular to the fluid flow resulting in constriction of the fluid flow at the entrance orifice 24. The fluid continues to flow from the entrance orifice 24 through the outlet passageway 26 to the outlet orifice 28 where the fluid is expelled toward the second surface 104a of the second body 104.

Figure 2:
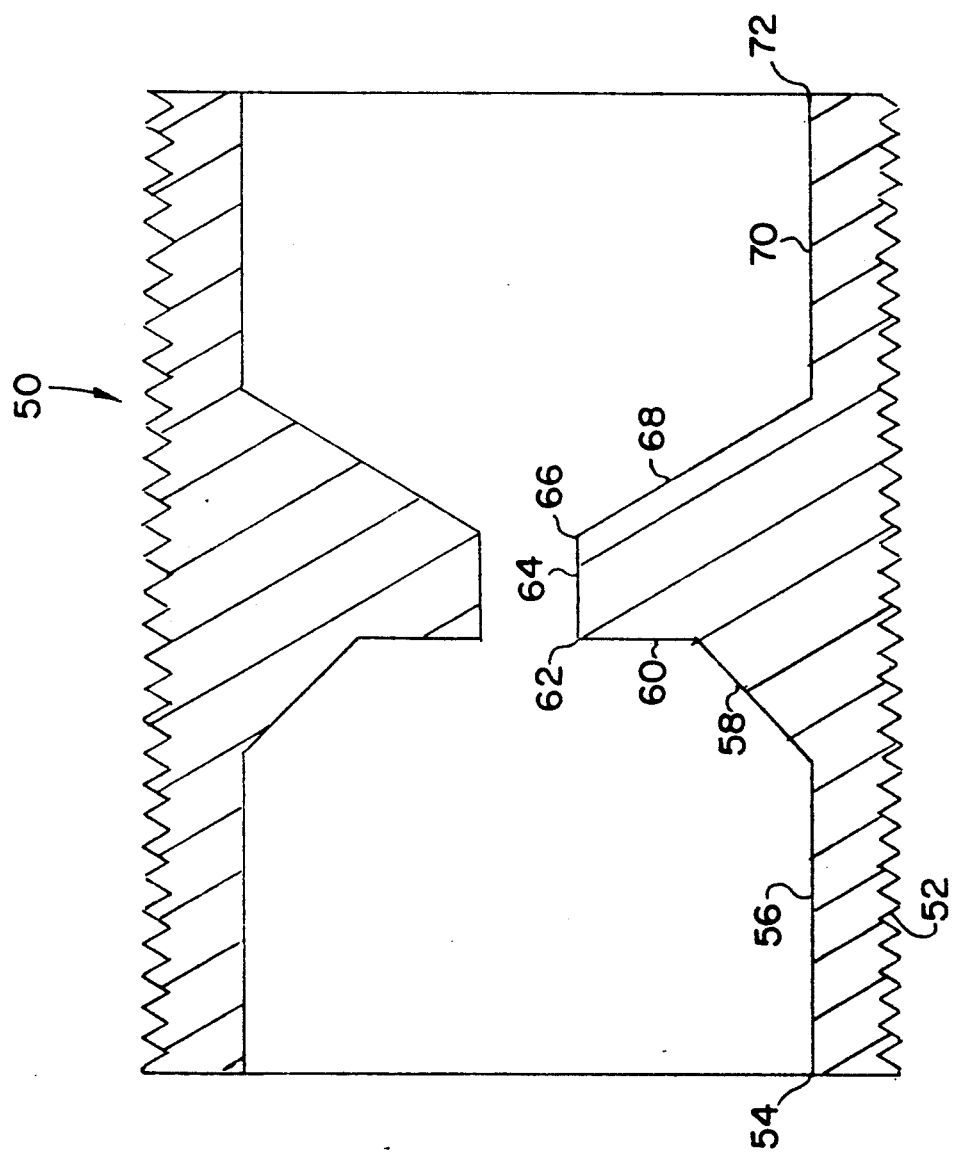
FIG. 2 is a cross-sectional view of a preferred upstream orifice of this invention.

In one application of the invention, the first and second bodies 102 and 104 correspond to first and second molding elements of a molding system and the fluid line 112 is constructed of heat tolerant (Trademark of E.I. DuPont de Nemours) heat tolerant material to withstand high temperatures present within the molding elements. Additionally, as shown in FIG. 2, the upstream orifice means 50 includes a threaded, generally cylindrical outer surface 52 adapted to be connected to the fluid line 112. Inner surface 56 is a smooth, generally cylindrical surface having a relatively short length extending from the rearwardmost surface of means 50 to the chamfered wall 58. Chamfered wall 58 forms a frustoconical annular surface that extends from the forwardmost portion of inner surface 56 to the innermost surface portion of orifice shoulder 60 at an angular relationship of about 45° with respect to inner surface 56 and orifice shoulder 60. Orifice shoulder 60 extends perpendicularly to the fluid flow to the orifice inlet 62. Fluid in the center portion of the fluid line enters the orifice inlet 62 which, in a preferred system of this invention, has a diameter of about 0.081 inch. The orifice passageway 64 is a smooth, generally cylindrical surface with an unspecified, but relatively short length extending from the orifice inlet 62 to the orifice outlet 66. Adjacent to orifice outlet 66 is a frustoconical surface 68 extending from the orifice outlet 66 to inner surface 70. The chamfered surface 68 forms an included angle of about 120° about the axis of the orifice passageway. Inner surface 70 has a diameter approximately the same as inner surface 56 and extends from the forwardmost portion of the outlet chamfer 68 to the end 72 of means 50. Although exact dimensions for the preferred geometric embodiment of the orifice means 50 are not critical, the length of orifice passageway 64 from the orifice inlet 62 to the orifice outlet 66 must be short enough so that significant boundary layer effects within the orifice passageway 64 are eliminated. Further, the orifice outlet chamfer 68 preferably forms a relatively acute angle (e.g., 30°) with respect to a plane perpendicular to the central axis of the orifice passageway 64 so that free fluid expansion will occur as the fluid exits the orifice outlet 66. Moreover, although the orifice inlet 62 is described in the preferred embodiment as having a diameter of 0.081 inch, embodiments employing a different diameter orifice are within the scope of this invention.

Orifices, such as orifice 50 are commercially available; for example, No. B-O-B-81 diameter orifice manufactured by O'Keefe Controls, Trumbull, Connecticut.

As set forth in Assignee's Patent, monitoring means 108 coacts with a correlating means 110 which can convert the pressure reading obtained by the monitoring means 108 to a digital signal which in turn can be analyzed by a data processor or stored on magnetic media. Such a system can include an analog-to-digital converter and a personal computer with the necessary software or, in a more preferred embodiment, can include an analog-to-digital converter and a dedicated high-speed microprocessor with on-board software located in permanent memory.

Figure 3:
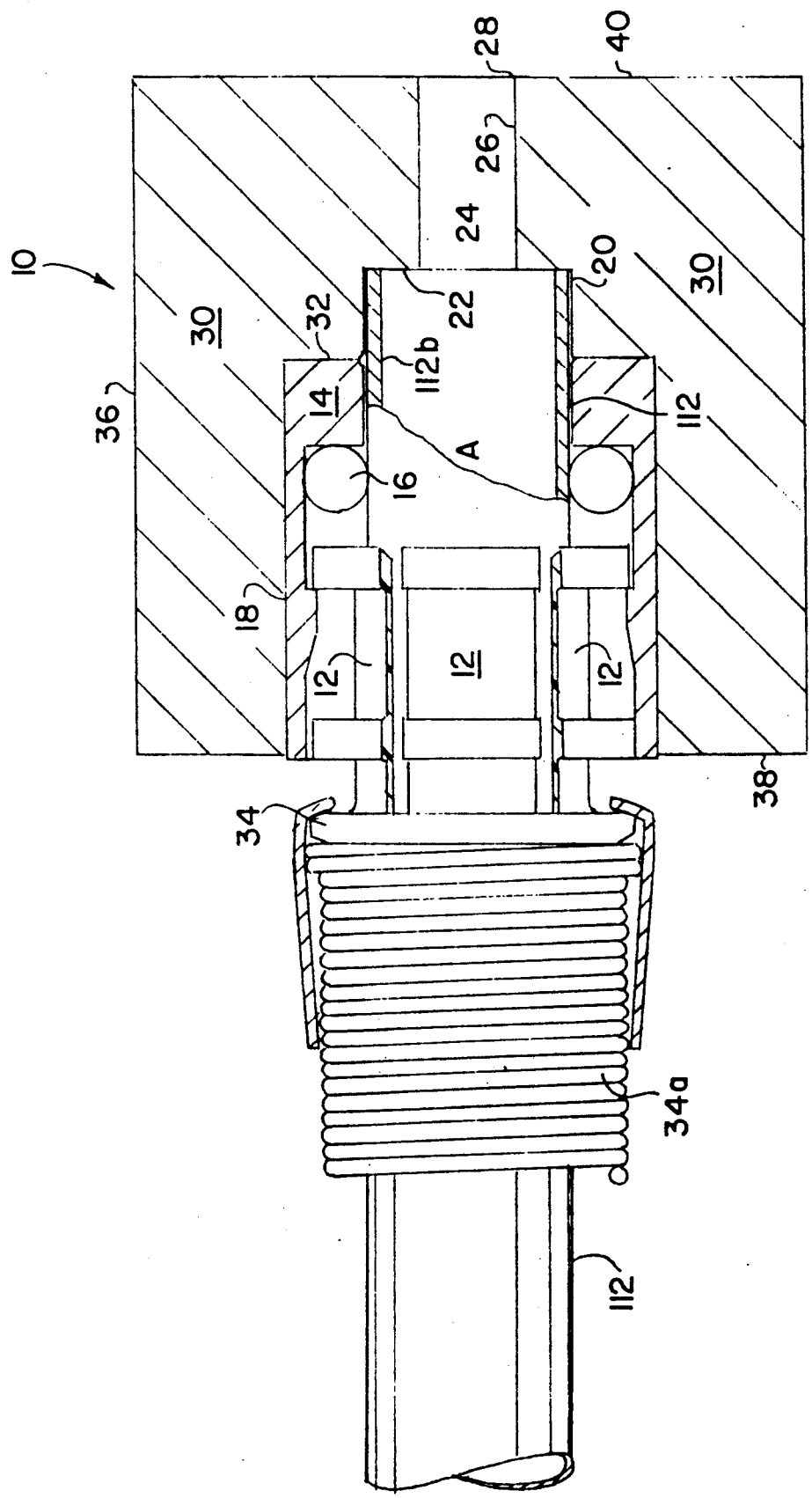
FIG. 3 is a cross-sectional view of a nozzle assembly of this invention, including the nozzle forming means, fluid line and means for connecting the fluid line to the nozzle.

FIG. 3 is a cross-sectional view of the means forming the nozzle assembly 10. In general, the nozzle assembly 10 is adapted to be positioned in the first body 102 as shown in FIG. 1 so that the outlet orifice 28 of the nozzle forming means 30 lies in a plane coincident with the first surface 102a of the first body 102.

As shown in FIG. 3, fastening means 34 can fasten the fluid line 112 to a male connecting means 12 and includes a spring 34a extending in a rearward direction surrounding and protecting the fluid line 112. A female connecting means 14 is press fitted into the nozzle forming means 30 and forms a receptacle into which the male connecting means 12 is inserted. An O-ring 16 is provided to prevent fluid loss at the interface between the fluid line 112 and the female connecting means 14. Although specific configurations are shown in FIG. 3 for connecting the fluid line 112 to the male connecting means 12 and for connecting male connecting means 12 to the female connecting means 14, other configurations are within the scope of this invention.

During operation, fluid under pressure passes through the fluid line 112, shown in partial cross-section in FIG. 3 and into the chamber A. As set forth above, fluid flow leaving the fluid line 112 at the forward portion of chamber A encounters a shoulder 22 extending in a direction perpendicular to the direction of gas flow. The sudden decrease in cross-section area at the entrance orifice 24 of nozzle forming means 30, it is believed, primarily allows only the flow from the center of the flow path of the fluid line 112 to enter the entrance orifice 24 and acts to block the variable flow caused by contact between the fluid and inner surface 112b of the fluid line 112. Thus, the resultant more consistent and reliable flow within the short passageway 26 is believed to provide the substantial increase in the reliability and accuracy of the measurements taken with the system of this invention. Moreover, a further increase in reliability and accuracy of the system is believed to be attained by maintaining a relatively short distance through the nozzle outlet passageway 26 from the entrance orifice 24 to the outlet orifice 28, thereby eliminating significant boundary layer effects and associated flow turbulence within the short outlet passageway 26.

The pressure within the fluid line 112 sensed by pressure monitoring means 108 will vary as the distance X between the first surface 102a and the second surface 104a varies and affects the fluid flowing between the nozzle forming means 30 and upstream orifice forming means 50. As fully explained in Assignee's Patent, the system can further include a correlating means 110 (FIG. 1) capable of converting the pressure measurement sensed by the monitoring means 108 into an analog or digital signal and provide an electrical output capable of stopping a manufacturing process, operating an alarm, or operating a printer or display device to record the spacing between surfaces 102a and 104a.

Figure 4:
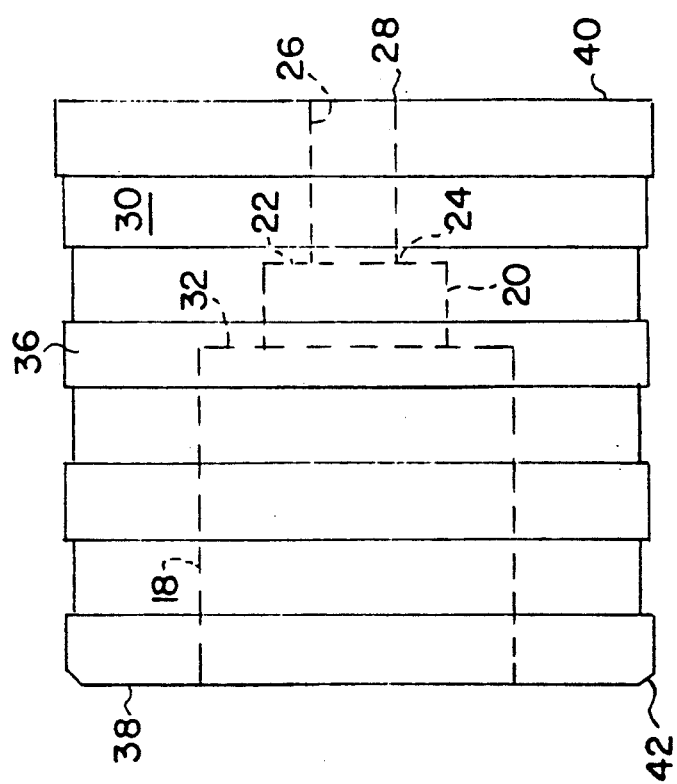
FIG. 4 is a cross-sectional view of a preferred embodiment of the nozzle forming means of this invention.

FIG. 4 illustrates a preferred embodiment of the nozzle forming means 30 adapted for press-fitting into a solid body, such as the first body 102 of FIG. 1 or one element of a die casting machine. The nozzle forming means 30 can be provided with a generally cylindrical surface 36 with a total outside diameter of about 0.999 inch. The generally cylindrical surface 36 has several shallow grooves cut into its circumference which are spaced equidistantly from the rearward surface 38 to the forward surface 40 of the nozzle forming means 30. These grooves have a diameter of 0.990 inch and allow the nozzle forming means 30 to be easily press-fitted into a first body 102 by reducing the surface area which must be deformed during the pressing operation. A chamfer 42 at the outer edge of the rearward surface 38 extending from the total outside diameter of about 0.999 inch to the groove diameter of 0.990 inches at about a 45° angle also encourages press-fitting of the nozzle forming means 30 into the first body 102.

As also shown in FIG. 4, a generally cylindrical inner surface 18 having a diameter of about 0.547 inch extends about 0.590 inch into the nozzle forming means 30 from the rearward surface 38 and forms a receptacle into which the female connecting means 14 of FIG. 3 can be press-fitted. With these dimensions, the nozzle forming means 30 can be used with a fluid line, preferably Teflon heat tolerant material having an outside diameter of 5/16 inch and an inside diameter of ¼ inch. At the entrance orifice 24, the fluid is restricted to a fluid path with a diameter of about 0.147 inch corresponding to diameter of the nozzle passageway 26. As indicated above, fluid leaving the passageway of fluid line 112 encounters shoulder 22 at the forward wall of chamber A which extends about 0.050 inch radially inward from the inside diameter of the fluid hose 112 in a direction perpendicular to the fluid flow from the fluid hose 112. The nozzle passageway 26 is formed by smooth, cylindrical surface with a diameter at the outlet orifice 28 of about 0.147 inch, and a length of 0.281 inch extending from the nozzle inlet 24 to the nozzle outlet 28. With dimensions such as those given above, the system of this invention is capable of measuring the distance between a first surface 102a and a second surface 104a with an accuracy of ±0.0001 inch.

While the preceding description illustrates the presently known best mode for carrying out the invention, as will be apparent to those skilled in the art, the scope of this invention is not limited to the described best mode and is limited only by the scope of the invention, the following claims and the prior art.

We claim:

1. In a system for measuring the distance between two surfaces comprising means for providing a flow of fluid, nozzle forming means to direct the flow of fluid between one surface and another surface, orifice forming means located upstream in the flow of fluid between said means for providing a flow of fluid and said nozzle forming means, and means to monitor the fluid pressure between said nozzle forming means and orifice forming means, the improvement wherein the nozzle forming means comprises a short outlet passageway defined by a smooth, substantially cylindrical wall having a length less than about twice its diameter and terminating in an outlet orifice and having an entrance orifice surrounded by a wall portion that is substantially perpendicular to the central axis of the short outlet passageway.

2. The system of claim 1 wherein the smooth cylindrical wall forming the short passageway and outlet orifice has a diameter of 0.147 inches.

3. The system of claim 1 wherein said short outlet passageway is formed by an "O" taper tool with a diameter of 0.147 inches.

4. The system of claim 1 wherein the downstream exit of the upstream orifice forming means is formed by a surrounding frustoconical wall having an included angle of about 120° about the central axis of a short substantially cylindrical passageway.

5. The system of claim 1 wherein said nozzle forming means is positioned such that the outlet orifice is located in a plane coincident with one of the surfaces.

6. The system of claim 1 wherein said nozzle forming means includes an outside surface positioned to be press-fitted into a solid body forming one of the surfaces.

7. A system for measuring the distance between a first and second surface which are in relatively close proximity to each other, comprising:
   a pressure source capable of providing fluid under known pressure to the system and defining a flow of said fluid between the first and second surfaces;
   a nozzle forming means having a smooth cylindrical surface defining a short nozzle passageway having an entrance orifice located at the upstream side of said nozzle passageway and an outlet orifice located at the downstream side of said nozzle passageway, a gas flow chamber formed in the upstream side of said nozzle forming means extending to said short nozzle passageway, a surface forming the entrance orifice of said short nozzle passageway and extending perpendicular to the central axis of said short nozzle passageway outwardly from said entrance orifice to surfaces defining said gas flow chamber, said short nozzle passageway having a length less than about twice its diameter;
   a fluid line extending from said pressure source to said nozzle forming means;
   connecting means for forming a sealed connection between said nozzle forming means and the fluid line;
   means for defining an upstream orifice in sad fluid line located between sad pressure source and said nozzle forming means;
   monitoring means for sensing the pressure in said fluid line between said upstream orifice and said short nozzle passageway; and correlating means for correlating the pressure within said fluid line to the distance between said first and second surfaces.

8. The system of claim 7 wherein said correlating means includes means for converting fluid pressure sensed by said monitoring means to a digital signal.

9. The system of claim 7 wherein the short nozzle passageway has a diameter of 0.147 inches and wherein the fluid line abuts the surface forming the entrance orifice of the short nozzle passageway and has an inside diameter of 0.250 inches.

10. The system in claim 9 wherein said correlating means includes means for converting fluid pressure sensed by said monitoring means to a digital signal.

11. The system of claim 7 wherein said system comprises a molding system including a first molding element forming the first surface and a second molding element forming the second surface.

12. The molding system in claim 11 wherein said correlating means includes means for converting the fluid pressure sensed by said monitoring means to a digital signal.

13. The system of claim 7 wherein the means defining an upstream orifice comprises a short generally cylindrical passageway with smooth walls, having an entrance orifice defined by a wall extending outwardly from the entrance orifice in a plane perpendicular to the passageway walls and having an exit orifice defined by a frustoconical wall extending outwardly from the exit orifice wall.

14. The system of claim 13 wherein the short nozzle passageway has a diameter of 0.147 inches and the passageway of the upstream orifice has a diameter of 0.081 inches.

15. The system of claim 14 the fluid line has an inside diameter of 0.250 inches.

16. In a system for measuring the distance between two surfaces comprising means for providing a flow of fluid, nozzle forming means to direct the flow of fluid between one surface and another surface, orifice forming means located upstream in the flow of fluid between said means for providing a flow of fluid and said nozzle forming means, and means to monitor the fluid pressure between said nozzle forming means and orifice forming means, the improvement comprising:

nozzle forming means comprising a short outlet passageway defined by a, substantially cylindrical wall terminating in an outlet orifice and having an entrance orifice surrounded by a wall portion that is substantially perpendicular to the central axis of the short outlet passageway, said upstream orifice forming means comprising a short substantially cylindrical passageway having a diameter of about 0.08 inches between its upstream entrance and downstream exit, and said upstream entrance of the upstream orifice forming means being formed by walls having an immediately surrounding portion that is substantially perpendicular to the passageway and an outer surrounding annular frustoconical portion having an included angle of 90° about the central axis of the short substantially cylindrical passageway.

17. A system for measuring the distance between two surfaces, comprising means for providing a flow of fluid;

nozzle forming means to direct the flow of fluid between two surfaces, said nozzle forming means comprising a short outlet passageway defined by a smooth, substantially cylindrical wall terminating in an outlet orifice and having an entrance orifice surrounded by a wall portion that is substantially perpendicular to the central axis of the short outlet passageway;

orifice forming means located upstream in the flow of fluid between said means for providing a flow of fluid and said nozzle forming means;

means to monitor the fluid pressure between said nozzle forming means and orifice forming means;

a fluid line for providing a flow of fluid to said nozzle forming means; and connector means for connecting said fluid line to said nozzle forming means, said connector means including:

a female connecting means carried by said nozzle-forming means;

a male connecting means positioned to releasably engage said female connecting means;

an O-ring positioned at the interface between said fluid line and said female connecting means to provide a fluid tight seal at said interface; and a fastening means for fastening said fluid line to said male connecting means.

* * * * *

UNITED STATES PATENT AND TRADEMARK OFFICE
CERTIFICATE OF CORRECTION

PATENT NO. : 5,171,584

DATED : December 15, 1992

INVENTOR(S) : Charles R. Ramsey, et al.

It is certified that error appears in the above-identified patent and that said Letters Patent is hereby corrected as shown below:

In col. 3, line 42, change "heat tolerant" to --TEFLON--.

In col. 4, line 18, after "orifice 50" insert --","-- (comma).

In col. 4, line 19, change "B-O-B-81" to --B-81 with a 0.081--.

In col. 6, line 63, change "sad" to --said--.

In col. 6, line 64, change "sad" to --said--.

Signed and Sealed this

Twenty-sixth Day of April, 1994

Attest:

BRUCE LEHMAN

*Attesting Officer*  *Commissioner of Patents and Trademarks*